Figure 1:
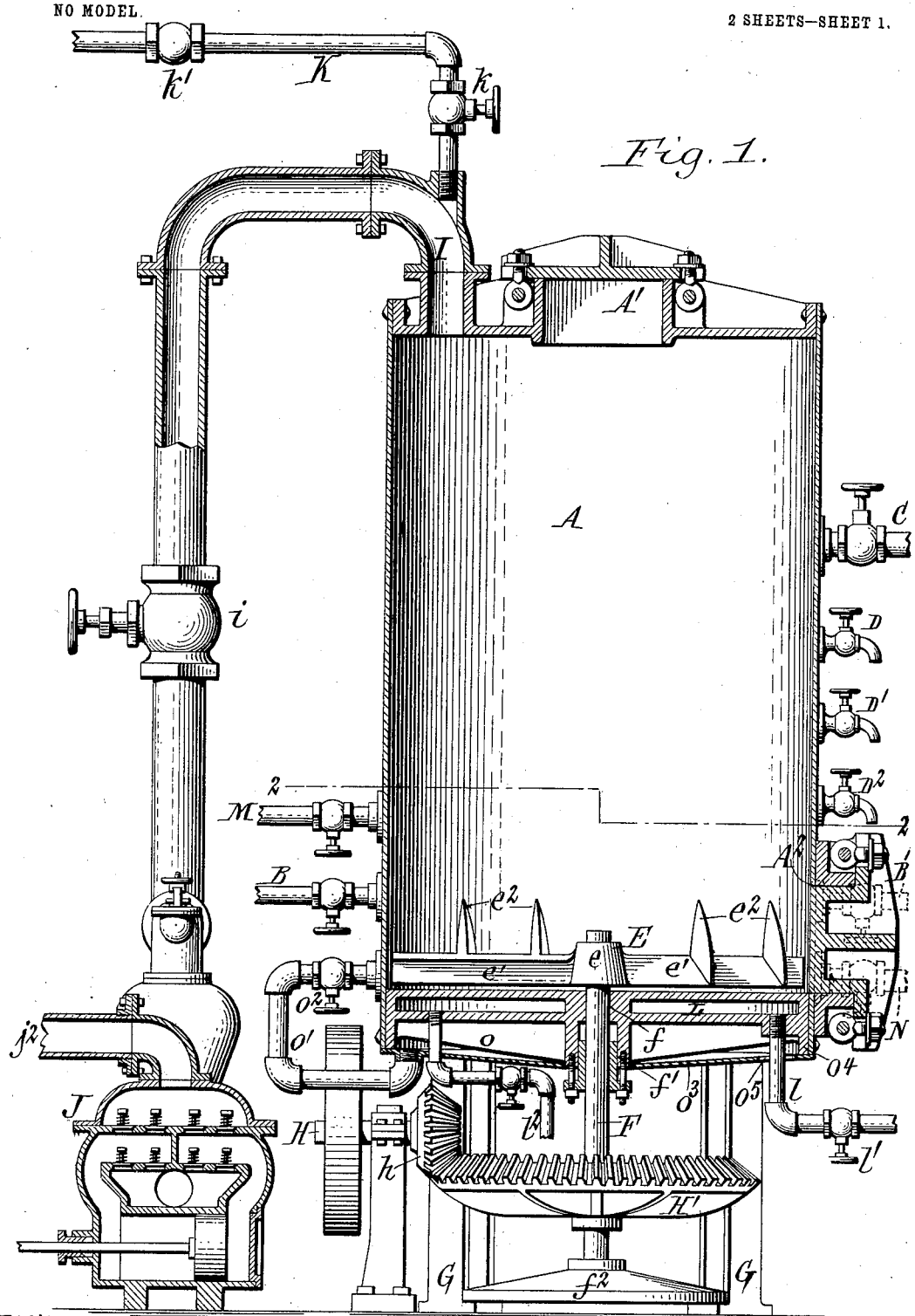

No. 735,987. PATENTED AUG. 11, 1903.
F. KLEINSCHMIDT & C. H. A. WANNENWETSCH.
RENDERING APPARATUS.
APPLICATION FILED JULY 5, 1902.
NO MODEL. 2 SHEETS—SHEET 2.
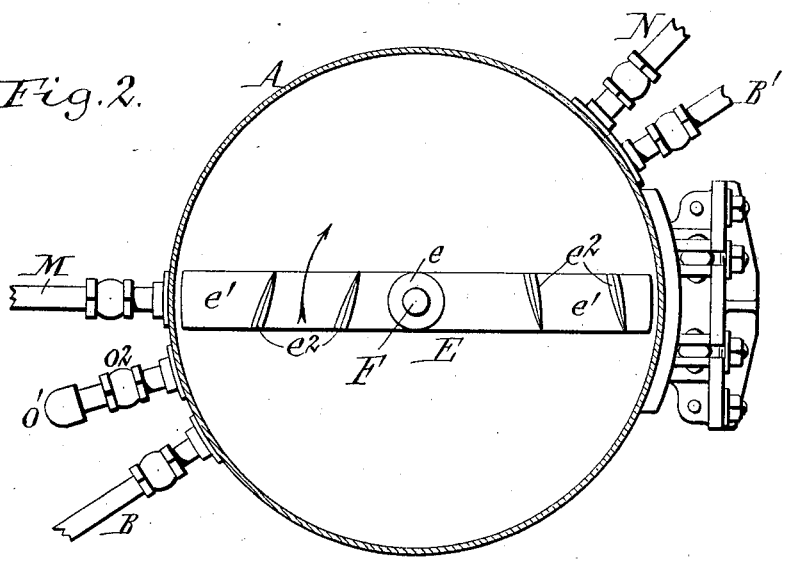
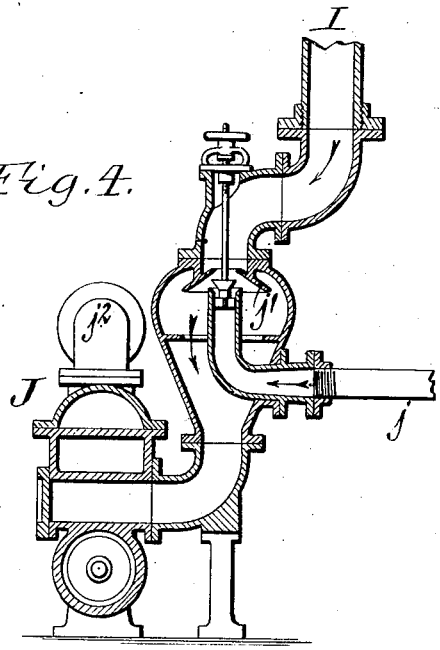
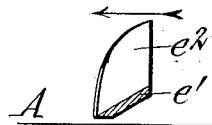
Witnesses:
Robert Weithnecht
Emma M. Graham
Frank Kleinschmidt
Chas. H. A. Wannenwetsch
Inventors,
By Geyer & Popp
Attorneys.

No. 735,987. Patented August 11, 1903.

UNITED STATES PATENT OFFICE.

FRANK KLEINSCHMIDT, OF DOYLE, AND CHARLES H. A. WANNENWETSCH, OF BUFFALO, NEW YORK.

RENDERING APPARATUS.

SPECIFICATION forming part of Letters Patent No. 735,987, dated August 11, 1903.

Application filed July 5, 1902. Serial No. 114,414. (No model.)

*To all whom it may concern:*

Be it known that we, FRANK KLEINSCHMIDT, residing at Doyle, and CHARLES H. A. WANNENWETSCH, residing at Buffalo, in the county of Erie, and State of New York, citizens of the United States, have invented new and useful Improvements in Rendering Apparatus, of which the following is a specification.

This invention relates to a rendering apparatus for extracting fat from animal matter, and more particularly to apparatus of this class in which the processes of extracting the fat and drying the residuum are successively performed in the same tank or vessel.

The objects of our invention are to improve the apparatus with a view of extracting a maximum percentage of fat from the stock and shortening the period of time required to render and dry a charge of the material, thus effecting a saving in labor and fuel and correspondingly reducing the cost of the ultimate products.

In the accompanying drawings, consisting of two sheets, Figure 1 is a sectional elevation of our improved apparatus. Fig. 2 is a horizontal section in line 2 2, Fig. 1. Fig. 3 is a cross-section of the agitator and a fragment of the tank-bottom. Fig. 4 is a transverse vertical section of the condenser-pump.

Similar letters of reference indicate similar parts throughout the several views.

A indicates a closed upright rendering and drying tank provided in its top with a manhole A' for the introduction of the material to be treated and in one side, near its bottom, with a similar manhole $A^2$ for the discharge of the solid residue. Connected with opposite sides of the tank, near its bottom, are valved steam-inlet pipes B B', which supply steam to the tank for steaming or cooking its contents. These pipes lead from a suitable source of supply. (Not shown in the drawings.)

C indicates a valved discharge-pipe for the liquid fat which is connected with the tank near its upper end, and D D' $D^2$ are test-cocks connected with the tank below the fat-discharge pipe and arranged at different elevations.

In the bottom of the tank is arranged a rotary agitator or stirrer E, which cuts and breaks up the stock in the tank and at the same time produces a circulation of the material downwardly through the central portion of the tank and upwardly along its sides. The agitator consists of a central hub $e$, secured to a vertical shaft F, and arms $e'$, extending radially from the hub, preferably in line with each other. These arms are beveled or inclined transversely in the direction of rotation of the agitator, so as to have a tendency to lift and loosen the material in passing through it. Each arm is provided with a number of upwardly-projecting teeth $e^2$, which cut through the mass, thereby disintegrating the substances and liberating the fat and gases during the steaming process and breaking up the bones during the drying process. The front or advancing edges of these teeth are comparatively sharp and preferably constructed to recede from their base toward their pointed upper ends, so that any hard substances not cut by the teeth ride over the same, thus avoiding clogging or blocking of the agitator. As shown in Fig. 2, the teeth on one of the agitator-arms are preferably arranged to trend inwardly at an angle to their circular path of travel, while the teeth on the other agitator-arm are arranged to trend outwardly at an angle to said path. By this arrangement the teeth of one set move the material outwardly or away from the center of the tank and those of the other set move it inwardly or toward the center, thereby bringing all portions of the stock in the bottom of the tank within the range of the teeth.

The agitator-shaft F extends downwardly from the agitator through a bearing $f$ and a stuffing-box $f'$ in the bottom of the tank, and the lower end of the shaft is supported in a step-bearing $f^2$, carried by the standards G, on which the elevated tank is supported. The shaft is driven from a horizontal main shaft H by a bevel-pinion $h$, mounted on the latter and meshing with a gear-wheel H', carried by the agitator-shaft. By this construction and arrangement the interior of the tank is wholly unobstructed except in its bottom, which contains the agitator, thus fully utilizing the capacity of the tank.

Extending from the top of the tank is an escape-pipe I for carrying off the noxious gases or vapors generated in the tank. This pipe preferably leads to a condenser-pump J, of any suitable construction, which withdraws the gases from the tank, condenses the same, and discharges the water of condensation into the sewer. The condenser-pump shown in the drawings is of a well-known type, $j$, Fig. 4, indicating the water-inlet pipe, which enters its condensing-chamber $j'$, the conical sprayer overhanging the mouth of this pipe, and $j^2$, Fig. 1, the discharge-pipe of the pump leading to the sewer. The gas-escape pipe I has a stop-cock $i$. Connected with this pipe, between its stop-cock and the tank, is an auxiliary gas-escape pipe K, which leads to the furnace or combustion-chamber of the steam-boiler that supplies the steam to the tank, so as to conduct the noxious gases generated during the steaming process to the furnace and consume the same. This auxiliary gas-pipe contains an ordinary stop-cock $k$ and also a suitable check-valve $k'$ for preventing flashing back of the fire from the furnace and avoiding an explosion of the tank, which might otherwise occur.

As shown in Fig. 1, the bottom of the tank is hollow to form a steam-jacket or heating-chamber L for drying the residue after drawing off the fat. Steam is supplied to this chamber by a pipe $l$, having a cock $l'$, and the water of condensation is discharged through a drain-pipe $l^2$.

$o$ indicates an air-heating chamber arranged underneath the steam-jacket L and connected with the lower portion of the tank by a pipe $o'$, having a valve $o^2$, so as to supply hot air to the tank for hastening the drying of the residue. The bottom of this hot-air chamber is formed by a conical plate $o^3$, secured to a depending marginal flange $o^4$ of the steam-jacket, which forms the side wall of said chamber, while the top of the chamber is formed by the bottom of the steam-jacket. The air in this chamber is thus heated by direct contact with the steam-jacket. The outer air is admitted to the chamber through an opening $o^5$ in its bottom.

The tank is preferably provided with a water-supply pipe M for adding a quantity of water to the stock, if required, and for washing the tank. The cleaning-water is drained off through a valved pipe N, leading from the bottom of the tank.

In the use of the apparatus after introducing the animal matter or other material to be treated into the tank through the upper manhole A' and tightly closing the latter. the test-cocks D D' D², and the valves of the vacuum-pipe I, the fat-discharge pipe C, the water-inlet and drain pipes M N, and the hot-air pipe $o'$ are closed, the cock of the auxiliary gas-escape pipe K is opened, and steam is admitted to the tank by opening the valves of the inlet pipes B B'. The contents of the tank are now thoroughly steamed or cooked without agitation for a period of about four hours, thereby rendering out the fat, the greater portion of which rises to the surface of the mass, while the rest remains intermingled with the stock, owing to the pressure in the tank. The noxious gases generated during the steaming stage are expelled from the tank by the pressure and driven through the escape-pipe K into the boiler-furnace, where they are consumed. Although this escape-pipe is allowed to remain open while steaming the material, there is still a steam-pressure of about forty pounds in the tank, this pressure being necessary for obtaining the proper degree of heat to soften the bones in the stock. For this purpose the area of this pipe is smaller than the aggregate area of the steam-inlet pipes B B'. After steaming the material for the period above mentioned the agitator E is set in motion and the steaming of the material is continued under agitation for a further period of about an hour. The agitator breaks up the bones and cuts up or disintegrates the rest of the offal, thus liberating the fat in the bones and any fat entrapped in the offal. This separating action of the fat from the other matter is promoted by the circulation of the stock produced by the agitator. By this treatment from ninety to ninety-five per cent. of the fat is separated from the mass, leaving from five to ten per cent. of the fat in the fertilizer residuum or tankage in the lower portion of the tank. The agitator not only cuts and circulates the stock, but also forms channels in the same, which facilitates the liberation and ascent of the noxious gases. After thus steaming and agitating the mass the agitator is stopped, the steam is turned off to relieve the tank contents from pressure and allow the same to cool, and the contents are left at rest for a period of from one to two hours. The liquid fat is then drawn off through the discharge-pipe C, which latter is placed at such an elevation that in most cases all of the fat will be above the level of the same. If the layer of fat should extend below this pipe, the same may be drawn off by successively opening the test-cocks D D' D² until all the fat is removed. The fat having been drawn off, the residuum is next dried by admitting steam to the jacket L in the bottom of the tank and opening the valve of the hot-air pipe $o'$. At the same time the cock of the auxiliary gas-valve K is closed, the cock of the vacuum-pipe I is opened, the condenser-pump started, and the agitator set in motion. The noxious gases liberated from the residuum are withdrawn by the condenser-pump and after being condensed are discharged into the sewer. By drying the material *in vacuo* this operation is greatly hastened, the time required for this purpose being reduced to about one-third of that necessary under ordinary atmospheric pressure. The introduction of hot air into the tank also accelerates the drying of the residue, and as the lower side of the steam-jacket is utilized for heating the air this additional drying agent is obtained without extra expense. Owing to the exhaustion of the air from the tank by the condenser-pump the heated air is rapidly drawn from the hot-air chamber into the tank.

In order to examine the stock for determining whether it has been dried sufficiently, the uppermost test-cock D is first opened for destroying the partial vacuum in the tank and the cock of the drain-pipe N is then opened, whereupon a sample of the stock will be ejected through said pipe by the agitator.

In drawing off the fat preliminary to the drying operation only so much of the liquid contents is withdrawn from the tank as is necessary to remove all the fat. The remainder commingles with the solid portion of the stock and enriches the residual fertilizer product or tankage.

In order to extract the maximum percentage of fat from the animal matter, it is necessary to thoroughly disintegrate the mass in the tank and expose all particles thereof to the action of the steam. By avoiding all internal obstructions in the tank and arranging the agitator in the bottom of the same, as herein shown and described, the full capacity of the tank is not only utilized, but a more thorough and effective circulation of the material is permitted to take place than when the portion of the tank above its bottom is obstructed by heating-pipes, drums, or agitators. We thus secure by our improved apparatus the important advantages of thorough disintegration and complete exposure of the particles of the mass to the action of the steam and as a result extract the maximum percentage of fat from the stock.

As the offensive gases evolved during the steaming process are consumed in the boiler-furnace and the noxious vapors generated during the drying process are condensed and discharged into the sewer, the apparatus is sanitary and especially suitable for use in cities. All of the noxious gases are evolved during the steaming process, and for sanitary reasons it would be objectionable to condense the same and discharge them into the sewer. We therefore provide the auxiliary gas-escape pipe K, so that these gases may be conducted to the boiler-furnace and consumed.

We claim as our invention—

1. In a rendering and drying apparatus, the combination of a closed tank having its bottom provided with a steam-jacket or heating-chamber, steam-inlet and fat-discharge pipes connected with the tank above said jacket, an agitator arranged in the lower portion of the tank, a condenser-pump connected with the top of the tank by a valved pipe, and a valved gas-escape pipe also leading from the top of the tank, substantially as set forth.

2. In a rendering and drying apparatus, the combination of a closed tank having its bottom provided with a steam-jacket or heating-chamber, steam-inlet and fat-discharge pipes connected with the tank above said jacket, an agitator arranged in the lower portion of the tank, a condenser-pump connected with the top of the tank by a valved pipe, and a gas-escape pipe also leading from the top of the tank and provided with a stop-cock and a check-valve arranged to prevent the return of the discharged gas into the tank, substantially as set forth.

3. In a rendering and drying apparatus, the combination of a closed tank having steam-inlet and fat-discharge pipes, a steam-jacket arranged in the bottom of the tank, a hot-air chamber arranged underneath said jacket and heated by the latter, and a pipe leading from said hot-air chamber to the interior of the tank, substantially as set forth.

4. In a rendering apparatus, the combination of a closed tank having steam-inlet and fat-discharge pipes, and a rotary agitator arranged in the tank and having horizontal arms provided with two sets of upwardly-extending teeth, the teeth of one set being arranged to trend inwardly at an angle to their circular path of travel and those of the other set being arranged to trend outwardly at an angle to said path, substantially as set forth.

Witness our hands this 28th day of June, 1902.

FRANK KLEINSCHMIDT.
CHARLES H. A. WANNENWETSCH.

Witnesses:
CHARLES W. BRESTON,
CARL F. GEYER.